United States Patent [19]

Rogalla

[11] Patent Number: 5,314,621
[45] Date of Patent: May 24, 1994

[54] METHOD FOR THE BIOLOGICAL PURIFICATION OF WASTEWATER

[75] Inventor: Franck Rogalla, Paris, France

[73] Assignee: OTV (Omnium De Traitements Et De Valorisation), Courbevoie, France

[21] Appl. No.: 850,610

[22] Filed: Mar. 13, 1992

[30] Foreign Application Priority Data

Mar. 15, 1991 [FR] France ............................... 91 03160

[51] Int. Cl.$^5$ ............................................. C02F 3/10
[52] U.S. Cl. ..................................... 210/618; 210/620
[58] Field of Search ............... 210/617, 618, 150, 151, 210/620, 274, 275

[56] References Cited

U.S. PATENT DOCUMENTS

| 4,256,573 | 3/1981 | Shimodaira et al. | 210/618 |
| 4,415,454 | 11/1983 | Fuchs | 210/617 |
| 4,547,286 | 10/1985 | Hsiung | 210/738 |
| 4,582,609 | 4/1986 | Hunter, III et al. | 210/747 |
| 4,591,437 | 5/1986 | Ernryd et al. | 210/265 |
| 4,756,831 | 7/1988 | Menzel et al. | 210/150 |
| 5,147,547 | 9/1992 | Savall et al. | 210/618 |

FOREIGN PATENT DOCUMENTS

| 0046900 | 8/1981 | European Pat. Off. . |
| 0280620 | 8/1988 | European Pat. Off. . |
| 3433472 | 9/1984 | Fed. Rep. of Germany . |
| 3742219 | 6/1989 | Fed. Rep. of Germany . |
| 2538800 | 12/1982 | France . |

Primary Examiner—Ivars Cintins
Attorney, Agent, or Firm—Browdy and Neimark

[57] ABSTRACT

The water to be treated is sent in a co-current with oxygenated gas into an upflow reactor with a fixed bed of particles, and the bacteria support medium used comprises particles with a bulk density of 35 to 65 kg/m$^3$. The reactor or biological filter (or reactors or biological filters in series) comprises or comprise: a zone for the densification of sludges; at least one oxygenated gas injection device; a zone of filtering material, a retention ceiling and a washing water storage zone with removal of the treated effluent. Application to the treatment of wastewater and water to be made fit for drinking purposes.

2 Claims, 2 Drawing Sheets

METHOD FOR THE BIOLOGICAL PURIFICATION OF WASTEWATER

BACKGROUND OF THE INVENTION

1. Field of the Invention

The present invention relates to the field of the biological purification of wastewater such as, notably, municipal effluents, industrial wastewater as well as supply water to be made fit for drinking. It concerns more especially a method of purification in which the water to be treated and the oxygenated gas are sent in ascending co-currents in a single reactor or biological filter provided with, as a filtering material, plastic materials or expanded materials with a density lower than that of water.

2. Description of the Prior Art

It is known that the biological treatment, for example of water, consists in degrading the organic impurities by the action of a purifying biomass that is free or fixed and that contains a variety of micro-organisms such as bacteria, yeasts, protozoa, metazoa etc. In the method using free biomass, by activated sludge, the concentration, in large numbers, of the various species of micro-organisms which have little settling capacity, is impossible to achieve inasmuch as the concentration of the biomass is obtained by settling. The method is therefore limited as regards the load applicable in terms of BOD (biological oxygen demand) and COD (chemical oxygen demand). In a system with a fixed biomass, the concentration of the biomass (with the bacteria) is achieved by making the bacteria cling to a carrier medium. The settling capacity is then no longer the essential criterion and this technique possesses a purification potential far greater than that of standard methods.

Among the most efficient methods based on the principle of purification with fixed biomass, we may cite notably those patented and developed by the Applicant, among them the so-called "Biocarbone" (registered mark) method and the technique consisting in the implementation, in a single upflow reactor of a granular bed constituted by two zones having different granulometry and different biological characteristics (French patents No. 76 21246 published under No. 2 358 362; No. 78 30282 published under No. 2 439 749; No. 86 13675 published under No. 2 604 990).

In the so-called free biomass techniques, reference will be made here especially to methods using fluidized beds wherein the material used as the biofilter consists of products with a density of less than 1 such as, for example, expanded polymers, according to processes which are now in the public domain (French patent No. 1 363 510 dated 1963; U.K. patent No. 1 034 076 dated 1962), various variant embodiments of which have led to numerous invention patents (French patents Nos. 330 652, 2 406 664, 2 538 800; U.S. Pat. No. 4 256 573; Japanese patent No. 58-153 590 etc.).

The use of these floating materials and of fluidized granular beds is promising in itself but entails a number of difficulties and frequently shows drawbacks. For example, if materials heavier than water (such as sand or similar materials) are fluidized, then a considerable input of energy is needed for the pumping of the liquid and it is difficult to control the keeping of the liquid inside the reactor. To overcome this drawback of energy consumption, it has been proposed to use a fluidized bed with light materials, having lower density than water, with an insufflation of air at the base of the bed but with a supply of descending water (U.S. Pat. No. 4 256 573 and Japanese patent No. 58 153590 referred to here above). However, from a certain downflow speed of the water, the air bubbles are trapped within the material or else carried along by the liquid flow and it is not possible to aerate the reactor properly.

With a view to obviating the above-mentioned drawbacks, numerous experiments have been conducted by the Applicant to use all the advantages of a floating bed in seeking to eliminate the phenomena of the trapping of bubbles on the surface, the clogging of the bed, energy consumption, the difficulties of washing the filtering bed, etc.

SUMMARY OF THE INVENTION

These difficulties have been overcome through the development of a system wherein, in the single reactor or biological filter with ascending co-currents of water and oxygenated gas, the filtration means and bacteria support medium used is a fixed bed of particles having lower density than water with a bulk density of 35 to 65 $kg/m^3$.

Although it is possible to use other light materials such as various expanded plastic materials, expanded shales or clays, cellulose products, etc . . . , the material advantageously used is constituted, according to the invention, by expanded polystyrene balls with a granulometric size ranging from 2 mm to 6 mm and with a bulk specific gravity of at least 0.035. In practice, the range of bulk specific gravity preferably goes from 0.035 to 0.065.

Numerous experiments carried out by the Applicant have established that only a rigorous selection of the above-mentioned desired range of bulk specific gravity makes it possible to obtain purification that is highly efficient and stable in time.

Indeed, it has been noted that by using polystyrene balls with a bulk specific gravity of less than 0.035, the material gives rise to phenomena of crushing and subsiding on the retention ceiling, thus causing major losses of hydraulic load and severe clogging of the bed.

Furthermore, the use of polystyrene balls with a bulk specific density of more than 0.065 not only entails technical difficulties of achievement but, in addition, causes the material to be carried away in an untimely manner when the bed is subjected to washing by counter-flows, and hence leads to unacceptable losses.

Further characteristics of the invention shall be highlighted in the rest of the present description.

Another object of the invention is a reactor or biological filter comprising, from bottom to top: a zone for the densification and removal of purification sludges; at least one air injection device; a zone of filtering material constituted by a layer of the above-mentioned light particles, a ceiling made of concrete or other perforated material and, finally, at the top of the reactor, a washing water storage zone at the tip of which there is provision for the removal of the treated effluent.

BRIEF DESCRIPTION OF THE DRAWINGS

A non-restrictive embodiment of a water treatment installation is illustrated in the appended drawings of which.

MORE DETAILED DESCRIPTION

Figure 1:
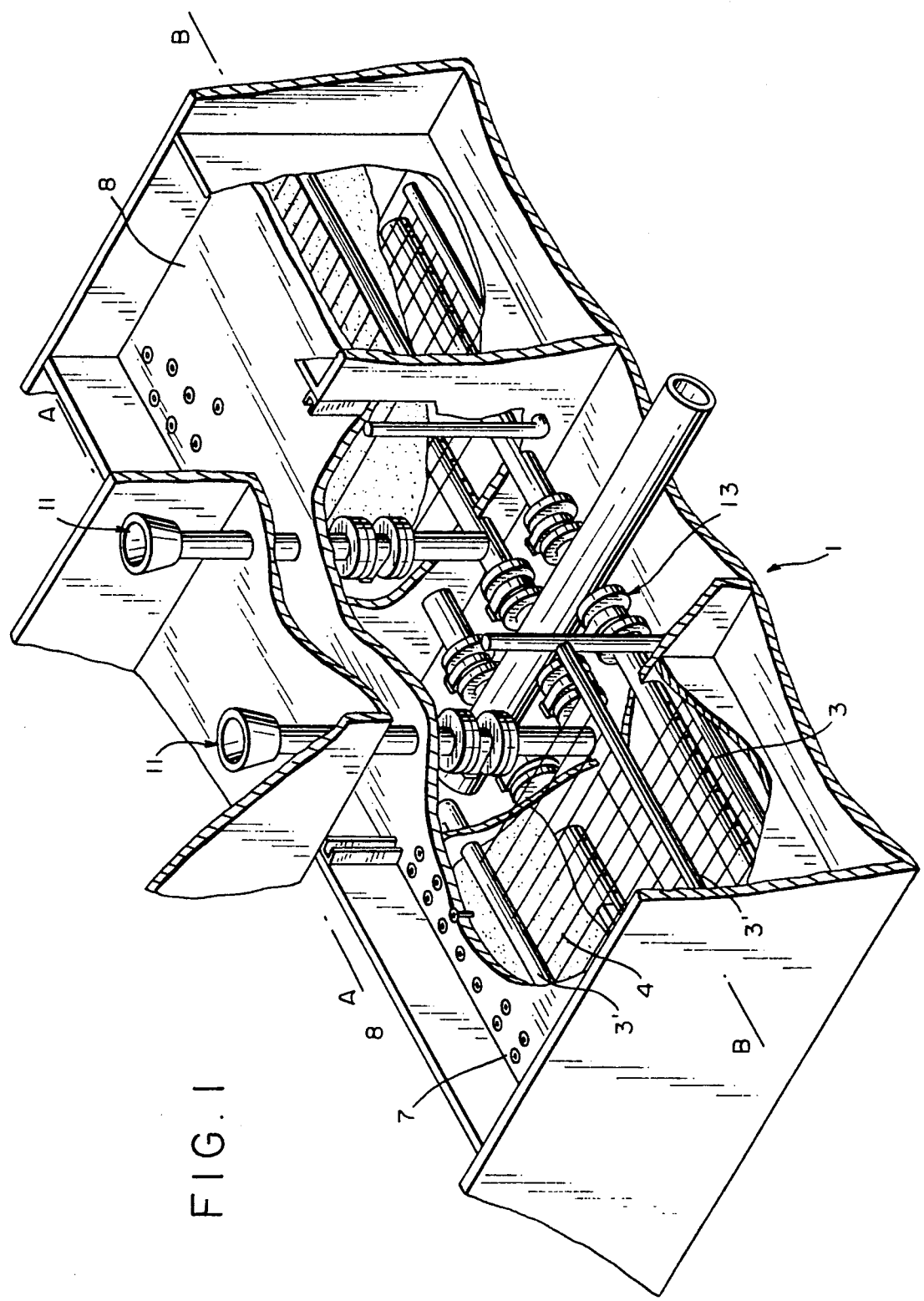
FIG. 1 shows an exploded perspective view of a treatment assembly, with two reactors or biofilters in parallel.
Figure 2:
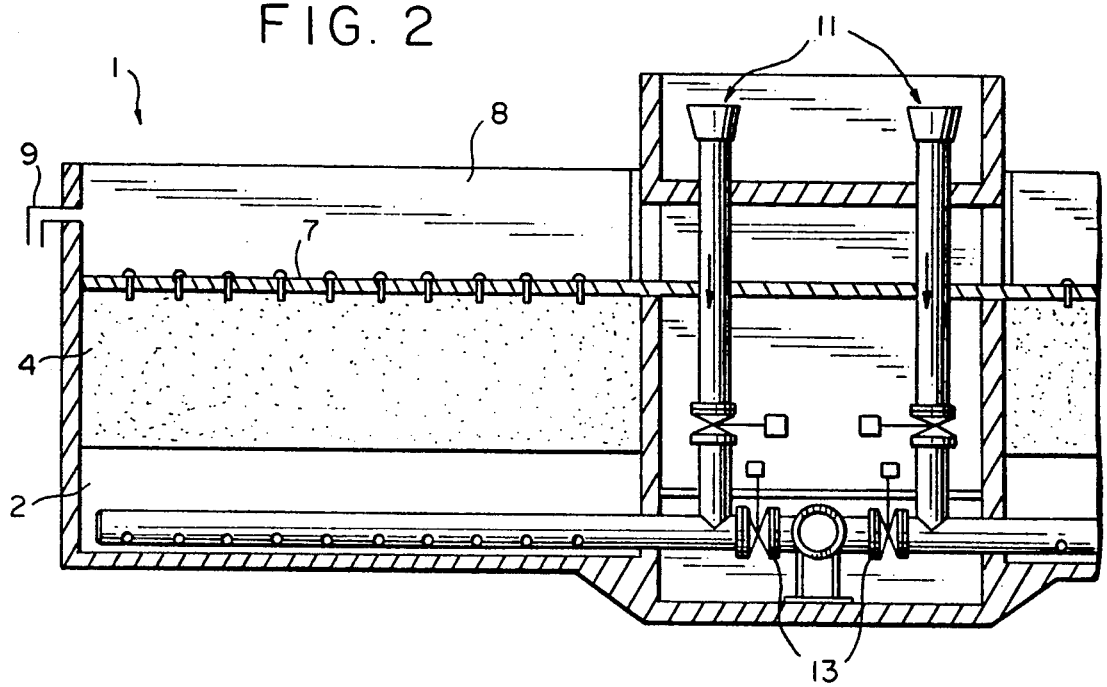
FIG. 2 shows a partial view of a reactor, in a sectional view taken along the line AA of FIG. 1.
Figure 3:
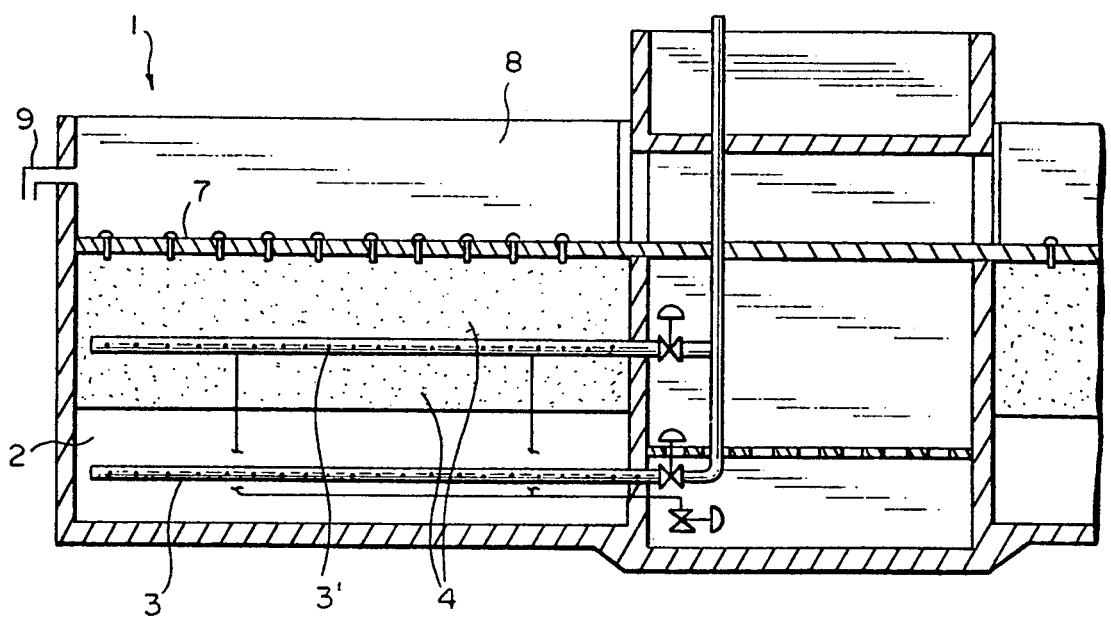
FIG. 3 shows a view of the same reactor along the section BB of FIG. 1.

According to these figures, a reactor 1 comprises, in its lower part, the space 2 for the densification and removal of the sludge; then the oxygenated fluid injection system 3 and the fixed bed 4 retained by the perforated plate 7 acting as a ceiling; and, finally, the free upper zone 8 acting as a washing reserve where the treated water is removed by the pipe 9.

The liquid to be treated arrives by the pipe 11 and is introduced into the zone 2, beneath the oxygenated gas injection device 3 which may be beneath the bed 4, as indicated in the figure, or again within this bed (reference 3').

When the air (or oxygenated gas) is introduced at the base by 3, an intensive exchange is obtained between the gas, the water to be treated and the biofilm that clings to the particles. During this operation, the bed 4 stays in a non-turbulent state (whence the term "fixed bed" used in the present description).

Due to the accumulation of suspended solids and the biological growth within the filtering bed, the material gradually gets clogged. The increase in the load loss may be followed by manometrical measurement or by the rising of the level of liquid in the loading or load loss measuring column 11. The retention of particles can be improved by the addition of a flocculent.

When a predefined load loss value is reached, the washing of the bed is set off. For this purpose, a flush valve 13 is opened until the desired washing speed is obtained. The rapid outflow, in a counter-current flow direction, of the liquid treated and stored in the upper part 8 of the reactor enables the expansion of the material. For the granulometric size and density of the material as defined hereabove, a washing speed of 30 to 80 m/h is chosen.

The rapid change to a counter-curent flow makes it possible to carry along the solids stored in the interstitial spaces and dislodge the excess biomass that has collected on the surface of the material, but the above-mentioned range of speed makes it possible to preserve the active biofilm on the material. After the draining of the reserve 8 and the closing of the valve 13, it is possible to restart the feeding with a load similar to the one used before washing.

A recycling of the purified effluent by a pump may, if necessary, enable the distribution to be improved or may enable the supply of nitrates in the prefiltration zone.

To extend the periods of time between the washings, very brief flushing operations, by the opening of the valve 13, may be done periodically to loosen the material and enable a deeper penetration of the impurities into the filtering bed. These mini-washing operations will further unclog the lower part of the filter which is more charged with suspended solids. The fast flushing operations may be set off in such a way as to provide for a balanced load loss throughout the height of the filtering bed. This makes it possible to do away with the regulation elements for the equidistribution of the oxygenated gas and of the water.

In order to prevent an excessively high compression of the bed by continuous insufflation, it is possible to provide for a pulsation of air or oxygenated gas. The insufflation of air, either pulsed or not pulsed, may be maintained during the washing to foster the unclogging of the bed.

According to an advantageous embodiment of the method, a battery of filters is set up as shown in FIG. 1. A common sheet of water will feed loading columns individually associated with each filter. The loading columns prevent the creation of excess pressure by an accidental clogging, if any, while at the same time compensating for the continuous clogging. With this gravitational supply, the flow rate can be easily measured and regulated by means of valves.

The washing water storage compartments of a battery of filters will be connected hydraulically to each other. Thus, the purified water of the filters in operation will supply the washing flow of the filter being unclogged, thus making it possible to give sufficient height and volume to the storage compartments superimposed on the filtering bed, it being possible to compute the dimensions as a function of the flow-rate and number of the filters.

EXAMPLARY EMBODIMENT

The operation was done in an installation for the treatment of polluted municipal wastewater containing five filtration cells arranged in parallel (each cell corresponding to a reactor 1 of the type described here above), each having an area of 16 $m^2$. The height of each cell or reactor was about 5.70 m and the height of the cellular material (in this case, polystyrene balls with a diameter of about 3.5 mm and a bulk specific gravity of 0.045) was about 3 meters.

The flow-rate of water treated was 2300 $m^3$/day and the characteristics of pollution were as follows: NTK : 40 mg; Kjehldahl total nitrogen; COD (chemical oxygen demand) : 400 mg; SS (suspended solids) : 100 mg/l.

The treated water, in the outgoing effluent had the following excellent characteristics: COD : 50 mg; SS : 10 mg/l; total nitrogen (N) : 8 mg; one mg of which corresponded to N of $NH_4$, 5 mg to N of $NO_3$ and 2 mg to organic N.

What is claimed is:

1. A method for biological purification of waste water, comprising:

providing a biological filter within a biological purification reactor, said biological filter comprising a bacteria support medium constituting a packed bed of particles retained in a lower part of said reactor by a perforated retention ceiling against upward movement, said support medium comprising expanded particles having a bulk density of 35-65 $kg/m^3$, a bulk specific gravity of 0.035-0.065, and a granulometric size of 2-6 mm;

passing water to be biologically purified upwardly through said reactor and through said packed bed of particles constituting said biological filter and simultaneously injecting oxygenated gas within said packed bed and passing said oxygenated gas upwardly in a co-current flow direction with said water to be biologically purified through said biological filter;

periodically backwashing said packed bed by using rapid outflow, in a counter-current flow direction, of the water treated and stored in an upper part of said reactor, said backwashing being carried out at a water outflow rate of 30–80 mh, and said injecting of oxygenated gas being maintained during said backwashing of said bed; and periodically carrying out brief-miniwashing flushing operations to loosen suspended solids within said packed bed and enable a deeper penetration of impurities into said packed bed.

2. A method according to claim 1, wherein said expanded particles are constituted by expanded polystyrene balls.

* * * * *